Patented Jan. 14, 1947

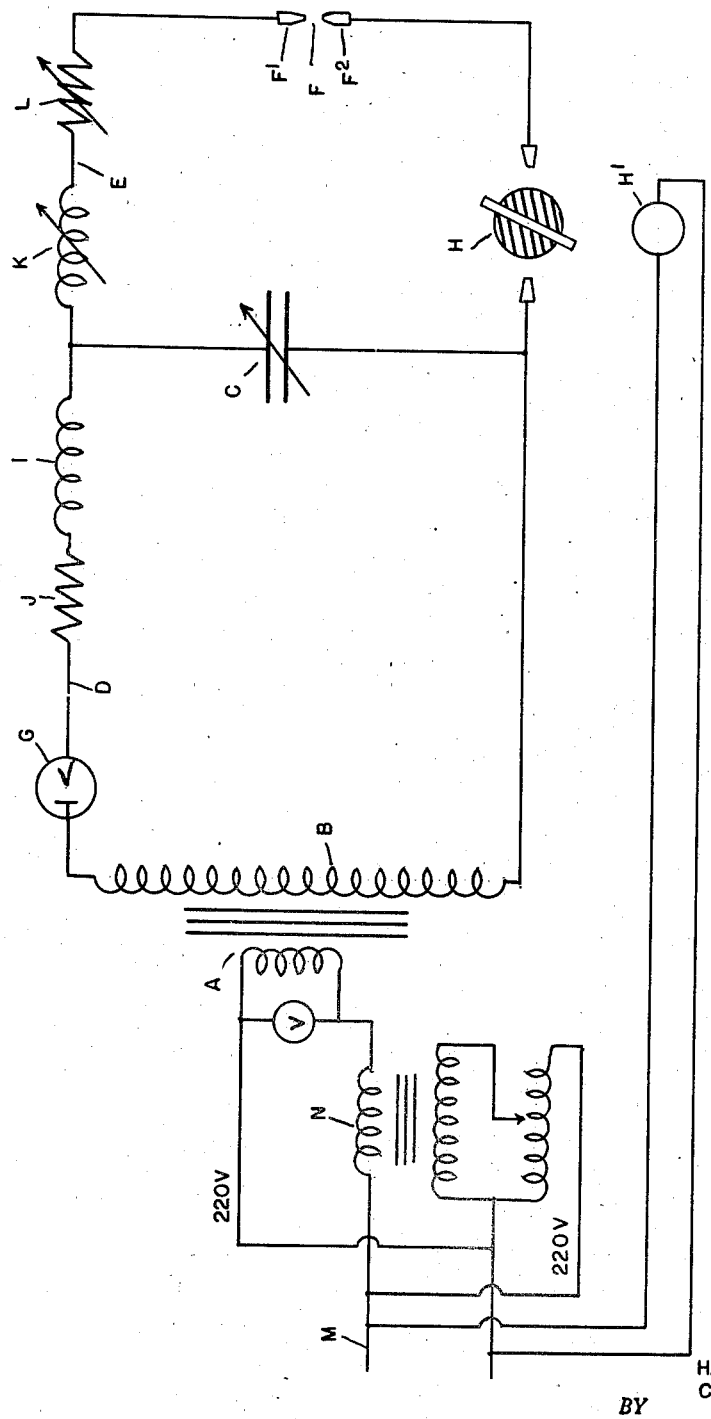
INVENTORS
HARRY W. DIETERT
CARL M. KING

2,414,363

UNITED STATES PATENT OFFICE 2,414,363

MEANS FOR GENERATING RADIANT ENERGY FOR SPECTRUM ANALYSIS

Harry W. Dietert and Carl M. King, Detroit, Mich., assignors, by direct and mesne assignments, to Maurice F. Hasler and Rowland W. Lindhurst, copartners doing business as Applied Research Laboratories, Glendale, Calif.

Application May 22, 1944, Serial No. 536,850

6 Claims. (Cl. 315—273)

The invention relates to apparatus for spectrum analysis and has particular reference to the means for generating radiant energy from the material to be analyzed.

Generally described, this means comprises a source of high-tension alternating electrical current, a condenser charged therefrom through a rectifier and a discharge circuit for said condenser including a synchronous interrupter in series with a spark gap containing the material to be analyzed.

It is the main object of this invention to provide a reproducible measured electrical discharge for generating radiant energy from the material to be analyzed.

It is a further object to limit the current in the spark gap to the condenser discharge current only, using one half cycle of the alternating current to charge the condenser and the following half cycle for exclusively discharging it.

It is a further object to control the high frequency oscillations of the condenser discharge circuit so as to change the character of the spark.

With these objects in view, the invention consists in the construction as hereinafter set forth.

The drawing is a diagram illustrating the electric circuits and associated instrumentalities constituting the radiant energy generating means.

As illustrated, A is a step-up transformer which is supplied with current from any available source. B is the secondary coil of the transformer. C is a variable condenser having a charging circuit D including the coil B and a discharge circuit E including the spark gap F. One or both of the electrodes F', F² having the spark gap F therebetween are formed of the material to be analyzed so that the wave lengths of the radiant energy generated by the arc are representative of the composition of the material.

To separate the condenser charging and discharging periods, a rectifying tube or valve G is placed in the circuit D thereby permitting the current to flow only in one direction, and limiting the charging period to that portion of the alternating current cycle during which the tube plate is positive. During this period the discharge circuit E is opened which is effected by a circuit interrupter H synchronized with the cycle of the alternating current generator. Various devices may be used for this purpose but, as specifically shown, the interrupter H is driven by a synchronous motor H' energized by the alternating current supplied to the transformer. With the construction as thus far described, the condenser C is charged during one-half of the alternating current cycle and is discharged during the other half of the cycle through the spark gap F in which the radiant energy is generated.

The discharge from the condenser is a high frequency oscillation and, to minimize the reverse flow of current through the circuit D during this discharge, a high frequency choke coil I is placed in this circuit between the condenser and the rectifier G. There is also preferably placed adjacent to the rectifier a peak current limiting resistor J to protect the tube. The frequency of the oscillation in the circuit E is controlled by a variable inductance K and a variable resistance L controls the length of interval during which the oscillations are continued. A further control is effected by varying the voltage of the primary current which may be accomplished by any suitable means. As shown, the current from the supply line M is at 220 volts but the voltage is variably increased by a supplemental transformer N in the portion of the circuit passing through the primary coil B' of the transformer A. Thus, the operator may change the character of the spark by these various controls.

In operation, after proper adjustments have been made the radiant energy is generated at the spark gap F by the condenser discharge current. This radiation is passed through the analyzing apparatus (not shown) thereby determining the chemical composition of the material specifically placed in the spark gap for that purpose.

The circuit above described has been devised to produce a carefully controlled spark for the purpose of obtaining more accurate spectrographic analyses. The electrical discharge obtained is a series of sparks produced by the complete discharge of the condenser once each cycle in synchronism with the alternating current supply frequency. Each discharge is an accurately measured quantity of electricity since it comes from the condenser that has been charged to a definite peak voltage.

It is the function of the rectifier tube G in the circuit to permit the condenser to charge up to the peak voltage of the supply circuit, and to isolate it at that voltage. When the condenser has reached the peak voltage, its charge cannot leak off again through the supply circuit as the supply voltage decreases after having passed through its peak.

It is the function of the interrupter H to keep the condenser discharge circuit open until the rectifier tube G can no longer pass current, which is until the alternating supply voltage has reversed itself and the tube plate is negative. This function is highly essential since the vacuum tube can safely pass only a limited current and there is no other circuit element that has been provided that will sufficiently limit the current that would flow if the discharge circuit were complete when the tube plate is positive. Further than this, the desirable feature of a measured discharge would be lost if the charging period were not distinctly separated from the discharge period by means of the switching action of the interrupter H. There is no conceivable setting of the gap spacing at F that would eliminate the necessity of the interrupter H. Even if the gap F were spaced such that the spark would not occur until the condenser reached the peak voltage, there would be no assurance that the spark would not jump immediately the peak voltage was reached and while the tube plate was still positive were it not for the interrupter H.

What we claim as our invention is:

1. A radiant energy generating means for spectrographic analysis comprising a source of high tension alternating current, a circuit therefor, a condenser in said circuit, a half wave rectifier also in said circuit for charging said condenser to peak voltage and interrupting the current while maintaining said peak voltage charge, a discharge circuit for said condenser including a spark gap, and circuit closing and opening means for said discharge circuit synchronized to close the same during a predetermined portion only of the interrupted period of the charging circuit.

2. A radiant energy generating means for spectrographic analysis comprising a source of high tension alternating current, a circuit therefor, a condenser in said circuit, a half wave rectifier also in said circuit for interrupting current and maintaining peak voltage charge on said condenser during a portion of one-half of the cycle, a discharge circuit for said condenser including a spark gap, circuit closing and opening means for said discharge circuit synchronized with said alternating current to close the discharge circuit only during a portion of the current interrupted period of said charging circuit, thereby minimizing the passage of any portion from the discharge of said condenser through said charging circuit.

3. A radiant energy generating means for spectrographic analysis comprising a source of high tension alternating current, a circuit therefor, a condenser in said circuit, a rectifier also in said circuit for interrupting current in one-half of the cycle, a discharge circuit for said condenser including a spark gap, circuit closing and opening means for said discharge circuit synchronized with said alternating current to close the discharge circuit only during a predetermined portion of the current interrupted period of said charging circuit, and a high frequency choke in said charging circuit for minimizing passage therethrough of any portion of the discharge from said condenser.

4. A radiant energy generating means for spectrographic analysis comprising a source of high tension alternating current, a circuit therefor, a condenser in said circuit, a rectifier also in said circuit for interrupting current in one-half of the cycle, a discharge circuit for said condenser including a spark gap, circuit closing and opening means for said discharge circuit synchronized with said alternating current to close the discharge circuit only during a predetermined portion of the current interrupted period of said charging circuit, and means in the discharge circuit for varying the frequency thereof.

5. A radiant energy generating means for spectrographic analysis comprising a source of high tension alternating current, a circuit therefor, a condenser in said circuit, a rectifier also in said circuit for interrupting current in one-half of the cycle, a discharge circuit for said condenser including a spark gap, circuit closing and opening means for said discharge circuit synchronized with said alternating current to close the discharge circuit only during a predetermined portion of the current interrupted period of said charging circuit, and means in said discharge circuit for varying the frequency of the current therein and the length of period of discharge.

6. A radiant energy generating means for spectrographic analysis comprising a source of alternating current, a step-up transformer therefor, a condenser in the secondary circuit of said transformer, a rectifier also in said circuit for temporarily maintaining peak voltage charge on said condenser, a discharge circuit for the condenser including a spark gap, circuit closing and opening means for said discharge circuit synchronized to close the same only during a predetermined portion of the period of interruption of current flow in said charging circuit, a high frequency choke in said charging circuit for minimizing passage therethrough of any portion of the discharge from said condenser, means for varying the energizing voltage for said transformer, and means for varying the frequency of current in the discharge circuit.

HARRY W. DIETERT.
CARL M. KING.